(12) United States Patent
Lazaro et al.

(10) Patent No.: US 10,931,135 B2
(45) Date of Patent: Feb. 23, 2021

(54) ENERGY HARVESTING SENSOR

(71) Applicant: TEXAS INSTRUMENTS INCORPORATED, Dallas, TX (US)

(72) Inventors: Orlando Lazaro, Dallas, TX (US); Leonardo Estevez, Rockwall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 521 days.

(21) Appl. No.: 15/070,472

(22) Filed: Mar. 15, 2016

(65) Prior Publication Data

US 2017/0271910 A1 Sep. 21, 2017

(51) Int. Cl.
*H02J 7/34* (2006.01)
*H04W 4/80* (2018.01)
*H02J 50/10* (2016.01)
*G06K 7/00* (2006.01)
*H04W 72/04* (2009.01)
(Continued)

(52) U.S. Cl.
CPC .................. *H02J 7/34* (2013.01); *G06K 7/00* (2013.01); *H02J 50/10* (2016.02); *H04W 4/80* (2018.02); *H04W 72/0446* (2013.01); *H04W 72/0473* (2013.01); *G06K 19/0707* (2013.01);
(Continued)

(58) Field of Classification Search
CPC .... G01D 21/00; G08C 17/02; G06K 19/0701; H05B 37/0218; H05B 39/042; H02J 1/06; H02J 1/102; H02J 7/025; H02J 7/34; H02J 17/00; H02J 50/27; H02J 50/50; H01L 41/1136; H02M 3/07; H02M 3/156; H02M 3/335; H02M 7/217; H02M 7/06; H02M 2001/0083; H02N 2/18; H02N 2/181; H01Q 1/22; H01Q 1/2225; H01Q 1/248; Y02B 20/14; Y02B 70/14; Y10T 307/615; Y10T 307/625; H04W 4/008; H04W 4/80; H04W 72/0446; H04W 72/0473; H04W 84/18; H04W 88/08
See application file for complete search history.

(56) References Cited

U.S. PATENT DOCUMENTS 7,775,063 B2 * 8/2010 Thompson et al.
2005/0116545 A1 * 6/2005 Hamel ................ B60C 23/0411
307/46
(Continued)

FOREIGN PATENT DOCUMENTS

RU 111675 U1 12/2011

OTHER PUBLICATIONS

International Search Report for PCT/US2017/022562 dated Jun. 29, 2017.

*Primary Examiner* — Marsha D Banks Harold
*Assistant Examiner* — Dharmesh J Patel
(74) *Attorney, Agent, or Firm* — Lawrence J. Bassuk; Charles A. Brill; Frank D. Cimino

(57) ABSTRACT

An energy harvesting sensor node includes an energy harvesting sensor, an energy storage device, and a transceiver. The energy harvesting sensor is configured to extract energy from an external source at a rate proportional to a value of a first parameter of the external source. The energy storage device is configured to store the extracted energy from the energy harvesting sensor at the rate proportional to the value of the first parameter. The transceiver is configured to transmit a plurality of data transmission frames at a frequency proportional to the value of the first parameter.

20 Claims, 5 Drawing Sheets

(51) Int. Cl.
*G06K 19/07* (2006.01)
*H01M 10/42* (2006.01)
*H04W 84/18* (2009.01)
*H04W 88/08* (2009.01)

(52) U.S. Cl.
CPC ........ *H01M 10/4257* (2013.01); *H04W 84/18* (2013.01); *H04W 88/08* (2013.01)

(56) References Cited

U.S. PATENT DOCUMENTS

| | | | |
|---|---|---|---|
| 2010/0219789 A1* | 9/2010 | Bermak | G01J 1/02 |
| | | | 320/101 |
| 2011/0248846 A1* | 10/2011 | Belov et al. | |
| 2013/0204202 A1* | 8/2013 | Trombly et al. | |
| 2015/0138556 A1* | 5/2015 | LeBoeuf et al. | |

* cited by examiner

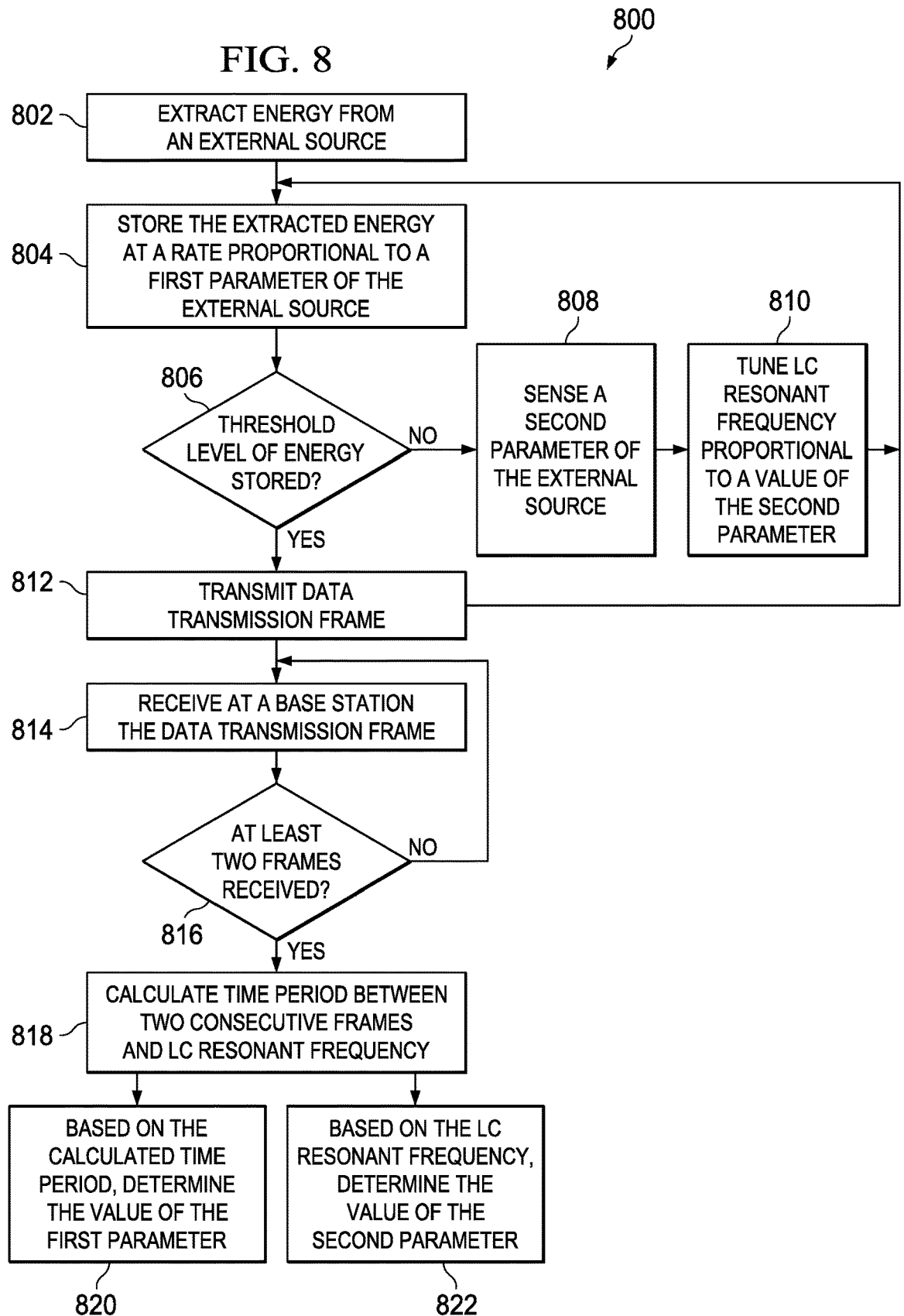

ENERGY HARVESTING SENSOR

BACKGROUND

Wireless Sensor Networks (WSNs) are used in various application areas including industrial process monitoring and control, environment and habitat monitoring, traffic control, building automation, health care applications, etc. In some such applications a powered sensor may be used in a harsh environment, and it is desirable for the sensor to be untethered after deployment for as long as possible. However, most sensors are powered by batteries, and limited battery capacity is a major limitation for deployment of untethered sensor nodes. Finite sensor node lifetime implies finite lifetime of the applications or additional cost and complexity to replace batteries. Energy harvesting, in which energy is derived from an external source such, is one alternative for increasing the longevity of sensor nodes. If an energy source is periodically available for harvesting, a sensor node may operate for a substantially longer time than if only battery-powered. However, WSNs require very small energy harvesting devices to keep the size of the sensor node and the cost of sensor node deployment to a minimum. Consequently, the amount of energy harvested may be relative small.

SUMMARY

The problems noted above are solved in large part by systems and methods for transmitting parameter information about an external source from an energy harvesting sensor node to a WSN base station. In some embodiments, an energy harvesting sensor node includes an energy harvesting sensor, an energy storage device, and a transceiver. The energy harvesting sensor is configured to extract energy from an external source at a rate proportional with a value of a first parameter of the external source. The energy storage device is configured to store the extracted energy from the energy harvesting sensor at the rate proportional with the value of the first parameter. The transceiver is configured to transmit a plurality of data transmission frames at a frequency proportional with the value of the first parameter.

Another illustrative embodiment is a method for transmitting parameter information about an external source from an energy harvesting sensor node to a WSN base station. The method may comprise extracting, by an energy harvesting sensor, energy from an external source at a rate proportional with a value of a first parameter of the external source. The method may also comprise storing, by an energy storage device, the extracted energy at the rate proportional with the value of the first parameter. The method may also comprise, in response to the energy storage device storing a threshold level of energy a first time, transmitting, by a sensor node transceiver, a first data transmission frame utilizing the energy storage device to provide power to the sensor node transceiver thereby decreasing the energy stored in the energy storage device below the threshold level. The method may also comprise, in response to the energy storage device storing the threshold level of energy a second time, transmitting a second data transmission frame.

Yet another illustrative embodiment is a WSN base station that includes a transceiver and a processor coupled to the transceiver. The transceiver is configured to receive a first plurality of data transmission frames from a first energy harvesting sensor node. The processor is configured to calculate a frequency of the first plurality of data transmission frames and determine a value of a first parameter of a first external source based on the frequency of the first plurality of data transmission frames.

BRIEF DESCRIPTION OF THE DRAWINGS

For a detailed description of various examples, reference will now be made to the accompanying drawings in which:

FIG. 8 shows an illustrative flow diagram of a method for transmitting parameter information about an external source from an energy harvesting sensor node to a WSN base station in accordance with various embodiments.

NOTATION AND NOMENCLATURE

Figure 1:
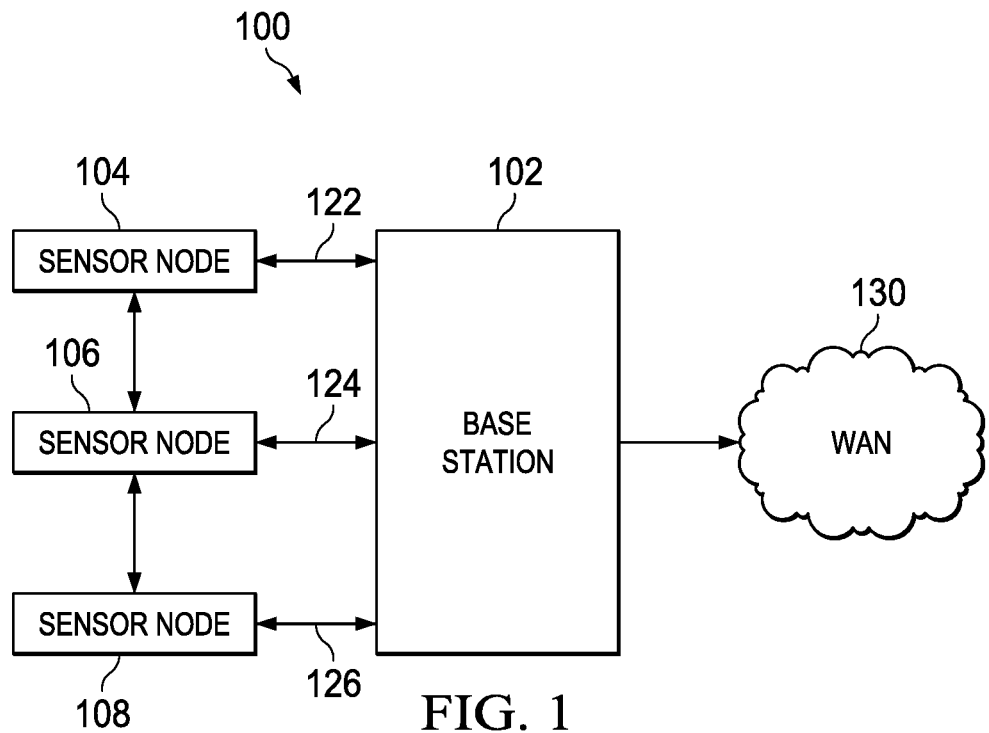
FIG. 1 shows an illustrative block diagram of a wireless sensor network (WSN) in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Most conventional sensors in a WSN are powered by batteries, and limited battery capacity is a major limitation for deployment of untethered sensor nodes. Finite sensor node lifetime implies finite lifetime of the applications or additional cost and complexity to replace batteries. Energy harvesting is one alternative for increasing the longevity of sensor nodes. However, WSNs require very small energy harvesting devices to keep the size of the sensor node and the cost of sensor node deployment to a minimum. Consequently, the amount energy harvested may be relative small. Therefore, it is desirable to reduce the amount of power required by the sensor nodes to sense and transmit sensor data to a base station of the WSN.

In accordance with the disclosed principles, a sensor node may include an energy harvesting sensor configured to harvest energy (i.e., extract and/or generate) from the surrounding environment. The energy harvesting sensor harvests this energy and stores the energy in a storage device at a rate proportional to a value of a first parameter of the surrounding environment. For example, if the energy harvesting sensor is configured to harvest thermal energy, then the energy harvesting sensor will harvest and store the energy at a rate proportional to the heat content (i.e., temperature) of the surrounding environment. Once enough energy is stored in the storage device to allow for the transmission of a data signal from the sensor node to the base station, the sensor node may transmit a burst of signal intensity (i.e., a data transmission frame) to be received by the base station. The transmission of the data transmission frame causes the storage device to discharge the energy stored within it because the energy stored in the storage device has been utilized to power the transmission. After the transmission, the energy harvesting sensor continues to harvest energy and store the harvested energy in the storage device at a rate proportional with the value of the first parameter of the surrounding environment (e.g., temperature). Again, once the energy stored in the storage device is sufficient to allow for the transmission of a data transmission frame, the sensor node transmits a second data transmission frame to be received by the base station. The process may be repetitive with enough energy repeatedly being harvested to power individual data transmissions. Because the storage device stores energy at a rate proportional to the value of the parameter (e.g., temperature) and/or at a rate that is a function of the parameter (e.g., f(temperature)=temperature$^2$) and the sensor node transmits the data transmission frame once the energy stored in the storage device is sufficient to allow for the transmission of a data transmission frame, the period and/or frequency of the data transmission frames is based on the value of the parameter of the surrounding environment (e.g., temperature). For example, more frequent data transmission frames may be transmitted in a warmer environment for thermal-based harvesting sensors, and less frequently in cooler environments.

The base station receives the data transmission frames from the sensor node and may determine the value of the parameter of the environment adjacent the sensor node (e.g., temperature). Because the timing of the data transmission frames is based on the value of the parameter of the surrounding environment (e.g., temperature), the base station may determine the value of the parameter based on the frequency and/or period of the transmissions. Because the energy harvester acts as its own sensor, a separate sensor that requires power is not needed. For example, if temperature is to be measured, then a temperature sensor separate from the energy harvesting sensor is not needed. The energy harvesting sensor transmits data packets at a rate that is proportional to the temperature surrounding the energy harvesting sensor, and thus temperature is encoded in the data packet transmission rate. Therefore, energy usage may be lowered in comparison to the conventional sensor node which includes a specific temperature sensor that is powered by a separate power source (e.g., a separate harvester and/or battery) whose reading is then transmitted by a transmitter to a base station.

FIG. 1 shows a block diagram of an illustrative wireless sensor network (WSN) 100 in accordance with various embodiments. Network 100 includes a base station 102 and a plurality of wireless energy harvesting sensor devices (104, 106, 108), also referred to as energy harvesting sensor nodes or simply, sensor nodes. Sensor nodes 104-108 detect a condition (i.e., parameter) of the environment in which they are disposed, and wirelessly communicate information indicative of the sensed environment to the base station 102 through signals 122-126. For example, sensor node 104 may be configured to detect heat content (i.e., thermal energy) of a source external to the sensor node 104 (i.e., the environment in which sensor node 104 is disposed) and communicate data corresponding to the temperature to the base station 102 utilizing signals 122-126. Additional examples of environmental conditions which sensor node 104 may be configured to detect include ambient light, kinetic energy, wind energy, energy from stress and/or strain, chemical potentials, ambient infrared light, and/or any other environmental signal that contains extractable energy. Each wireless sensor node may communicate with neighboring wireless sensor nodes to form an ad-hoc network in which a wireless sensor node repeats transmissions received from other sensor nodes to relay data through the network 100. Base station 102 may be configured to manage the sensor nodes 104-108, collect and analyze data received from sensor nodes 104-108, and connect network 100 with a wide area network (WAN) 130 for remote data access. Base station 102 receives measurement values, data corresponding to the measurement values, and other information transmitted by the sensor nodes 104-108, and may provide control information to the sensor nodes 104-108. While, as a matter of convenience, FIG. 1 shows only three sensor nodes 104-108 and a single base station 102, in practice, the network 100 may include any number of sensor nodes and base stations.

Figure 2:
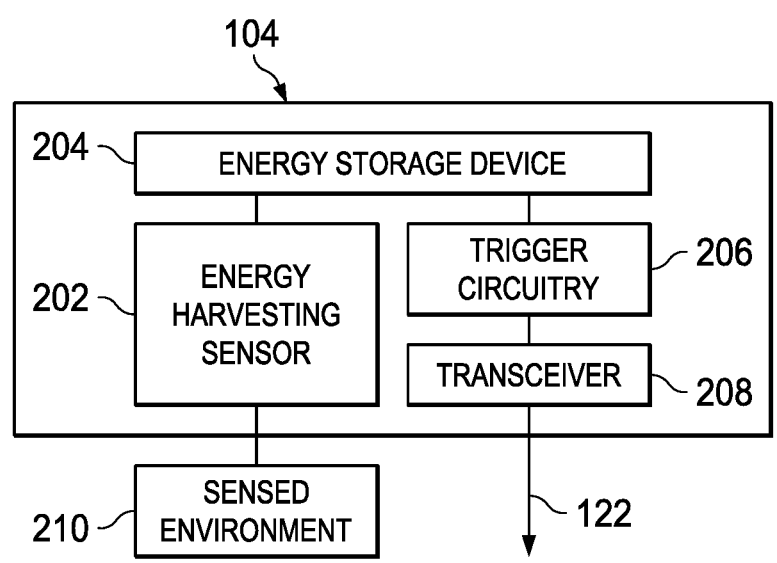
FIG. 2 shows an illustrative block diagram of an energy harvesting sensor node in accordance with various embodiments.

FIG. 2 shows an illustrative block diagram of energy harvesting sensor node 104 in accordance with various embodiments. The architecture of FIG. 2 may apply to any or all of the sensor nodes 104-108. Sensor node 104 may include an energy harvesting sensor 202, energy storage device 204, trigger circuitry 206, and transceiver 208. Energy harvesting sensor 202 is an energy harvesting device that is configured to extract and/or generate energy from the external source (i.e., sensed environment 210). For example, energy harvesting sensor 202 may extract solar power from ambient light of the sensed environment 210, thermal energy from heat of the sensed environment 210, kinetic energy from movement within sensed environment 210, wind energy from wind within the sensed environment 210, energy from stress and/or strain within the sensed environment 210, electrochemical energy from chemical potentials within the sensed environment 210, energy from ambient infrared light within sensed environment 210, and/or any other energy produced by certain conditions (i.e., parameters) within sensed environment 210. Thus, in some embodiments, energy harvesting sensor 202 may be a piezoelectric device, an electrochemical device, a solar device (e.g., a photovoltaic device), a thermoelectric generator, a wind turbine, and/or any other device that may generate energy from the conditions (i.e., parameters) within sensed environment 210. Energy harvesting sensor 202 may extract and/or generate the energy from the sensed environment at a rate proportional to a value of the parameter that is being utilized to generate the energy. For example, if energy harvesting sensor 202 is a thermoelectric generator, then the energy is generated at a rate that is proportional to the heat content (i.e., thermal energy) of the sensed environment 210 (e.g., the greater the temperature of sensed environment 210, the higher the rate of energy extraction and/or generation).

Energy that is extracted and/or generated by energy harvesting sensor 202 may be stored in energy storage device 204. In some embodiments, energy storage device 204 may be a battery (e.g., rechargeable battery), a capacitor, and/or a super capacitor. Thus, as the energy harvesting sensor 202 extracts and/or generates electricity at a rate proportional to a value of the parameter that is being utilized to generate the energy, the energy storage device 204 stores that extracted and/or generated energy at the rate that the energy is extracted and/or generated. For example, if the energy harvesting sensor 202 extracts thermal energy at a particular rate due to the value of the temperature of sensed environment 210, the energy storage device 204 will store that extracted energy at the rate that it was extracted. Thus, for instance, the magnitude of the charging current to the energy storage device 204 is a function of value of the parameter that is being utilized to generate the energy (e.g., the higher the thermal energy the higher the charge current).

Transceiver 208 may be any type of transceiver including a wired and/or wireless transceiver. More specifically, transceiver 208 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications including Wi-Fi and Bluetooth communications. Trigger circuitry 206 is coupled to the energy storage device 204 and the transceiver 208 and may be any hardware and/or software that is configured to cause the transceiver 208 to transmit a data transmission frame as signal 122 once the amount of energy stored in energy storage device 204 reaches a threshold level. In other words, once an amount of extracted energy reaches the threshold level, the trigger circuitry 206 may cause transceiver 208 to transmit a data transmission frame as signal 122. In some embodiments, the threshold level of energy that is needed to be stored in energy storage device 204 for trigger circuitry 206 to cause transceiver 208 to transmit a data transmission frame is the minimum amount of energy needed to enable a transmission of a data transmission frame. In other words, the sensor node 104 requires a minimum amount of energy to transmit a data transmission frame to the base station 102. In some embodiments, the sensor node 104 may utilize the energy stored in energy storage device 204 to enable transmissions utilizing transceiver 208. Therefore, the threshold level may be set to the minimum amount of energy needed to be stored in energy storage device 204 to enable a transmission of a data transmission frame utilizing transceiver 208. In some embodiments, the data transmission frame may be a Bluetooth low energy (BLE) frame, a WiFi frame, and/or a low-rate wireless personal area network (LR-WPAN) frame. In other embodiments, the data transmission frame may utilize any communication protocol.

Due to the transmission of the data transmission frame as signal 122, the energy stored in the energy storage device 204 may discharge to power the transmission, thus causing the amount of energy stored in the energy storage device 204 to drop below the threshold level and, in some embodiments, drop to zero. The energy harvesting sensor 202 continues to extract and/or generate energy and store the extracted energy in energy storage device 204 at a rate proportional with the value of the parameter being harvested (e.g., thermal energy) from sensed environment 210. Therefore, as the energy stored in the energy storage device 204 reaches the threshold level the second time (i.e., after the first data transmission frame has been transmitted), the trigger circuitry 206 again causes the transceiver 208 to transmit another data transmission frame as signal 122, thereby discharging the energy storage device 204. This cycle of charging the energy storage device 204 by harvesting energy from the sensed environment 210 and transmitting data transmission frames as the energy stored in the energy storage device 204 reaches the threshold level may continue for any number of times. Because the rate at which the energy storage device 204 stores energy, and therefore, the frequency of data transmission frames, is proportional to the value of the environmental parameter which causes the energy to be harvested, the frequency and or period of the data transmission frames may be utilized to determine the value of the parameter. For example, if energy harvesting sensor 202 is a thermoelectric generator, energy is generated at a rate that is proportional to the temperature of the sensed environment 210. Thus, energy is stored in the energy storage device 204 and the frequency of the data transmission frames is proportional to the temperature of the sensed environment 210. In other words, the frequency of the data transmission frames may be utilized to determine the value of the parameter being harvested (e.g., the frequency may be utilized to determine the actual thermal energy and/or temperature of the sensed environment).

Figure 3A:
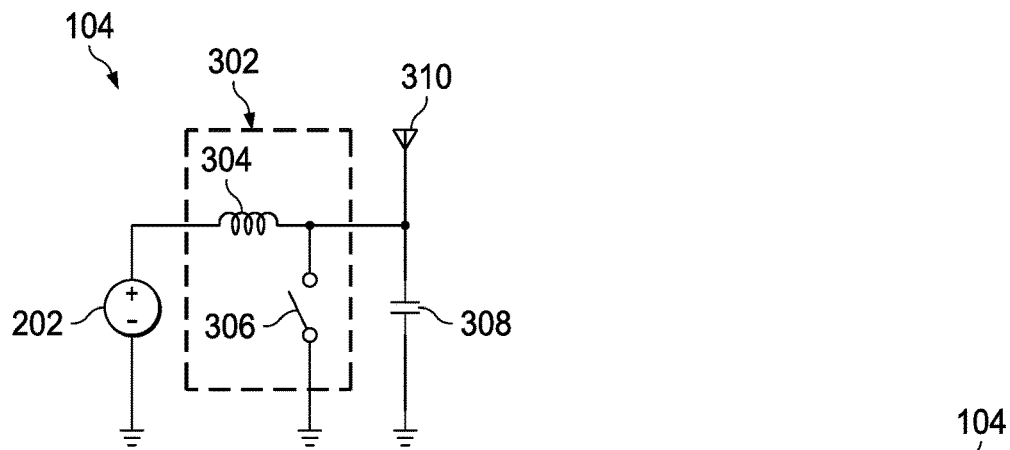
FIG. 3A shows an illustrative circuit diagram of an energy harvesting sensor node in accordance with various embodiments.

FIG. 3A shows an illustrative circuit diagram of energy harvesting sensor node 104 in accordance with various embodiments. In the example shown in FIG. 3A, the sensor node 104 includes energy harvesting sensor 202, relay 302 which may be comprised of inductor 304 and switch 306, capacitor 308, and antenna 310 which may be a part of transceiver 208. As discussed previously, the energy harvesting sensor 202 is configured to extract and/or generate energy from an external source, such as sensed environment 210. The energy extracted and/or generated may take the form of a voltage, such that energy harvesting sensor 202 acts as a voltage source. For example, the magnitude of the voltage is proportional to the sensed temperature. Thus, energy harvesting sensor 202, as it is extracting energy from the external source, magnetizes the relay 302's inductor 304 at a rate that is proportional to the value of the parameter being harvested (e.g., thermal energy), thus building energy inside the inductor 304. Switch 306 may be configured to be closed while the energy harvesting sensor 202 magnetizes the inductor 304. Thus, when no current flows through the inductor 304, the switch is closed. When current increases in the inductor 304, the magnetic field of the inductor 304 builds which energizes the inductor 304. Once a threshold level of current flows through inductor 304, the switch 306 opens through magnetic transduction. In other words, after a time period that is proportional to the energy extracted by the energy harvesting sensor 202, the switch 306 may be configured to open. For example, if energy harvesting sensor 202 is a thermoelectric generator, then the voltage is generated at a rate that is proportional to the temperature of the sensed environment 210 (e.g., the greater the temperature of sensed environment 210, the higher the rate of voltage generation); therefore, the switch 306 opens earlier when the temperature is higher and later when the temperature is lower.

In response to the switch 306 opening, energy transfers from the energy harvesting sensor 202 to be stored by the capacitor 308 acting as the energy storage device 204 and the switch 306 closes again. Inductor 304 and capacitor 308 create an LC circuit (i.e., a resonant circuit, tank circuit, or tuned circuit). The LC resonant frequency created by inductor 304 and capacitor 308 is tuned to antenna 310 causing the antenna to broadcast a data transmission frame as signal 122. In other words, as the energy transfers to the capacitor 308, the energy is stored into an LC tank which is connected to the antenna 310. The frequency at which this oscillation occurs (i.e., the frequency of the periodic transfer of energy from energy harvesting sensor 202 to the LC tank) corresponds with the amount of energy being generated by the energy harvesting sensor 202 which, in turn, corresponds with the value of the parameter being harvested (e.g., thermal energy) from sensed environment 210. Therefore, the frequency of the transmissions from antenna 310 is indicative of the value of the parameter being harvested (e.g., thermal energy).

Figure 3B:
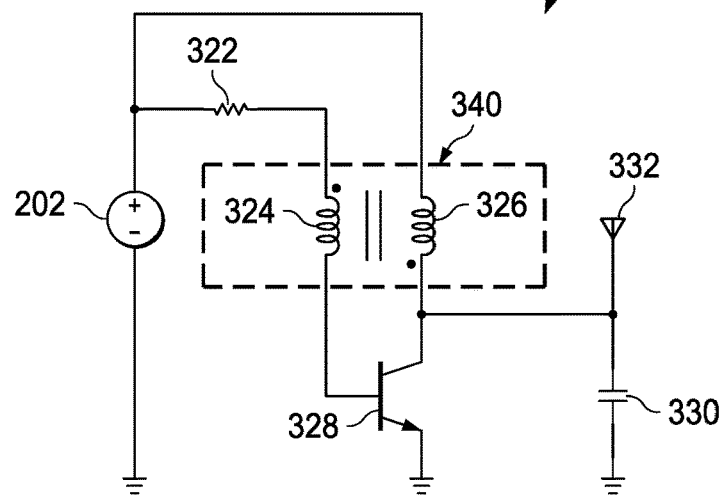
FIG. 3B shows an illustrative circuit diagram of an energy harvesting sensor node in accordance with various embodiments.

FIG. 3B shows another illustrative circuit diagram of energy harvesting sensor node 104 in accordance with various embodiments. In the example shown in FIG. 3B, the sensor node 104 includes energy harvesting sensor 202, resistor 322, secondary winding 324 and primary winding 326 that are connected in opposing directions to make up transformer 340, transistor 328 which may be an NPN bipolar junction transistor (BJT), capacitor 330, and antenna 332 connected together such that the sensor node 104 acts as a Joule thief radio. As discussed previously, the energy harvesting sensor 202 is configured to extract and/or generate energy from an external source, such as sensed environment 210. The energy extracted and/or generated may take the form of a voltage, such that energy harvesting sensor 202 acts as a voltage source. Thus, energy harvesting sensor 202, as it is extracting energy from the external source, drives a current with a value that is proportional with a value of a parameter of an external source (e.g., temperature) through resistor 322, secondary winding 324, and the base of transistor 328. This causes transistor 328 to conduct current through primary winding 326. Therefore, a positive voltage is induced in the secondary winding 324 turning on transistor 328. Thus, transistor 328 acts as a closed switch. However, once the collector current of the transistor 328 reaches a threshold level associated with magnetic core saturation of the transformer, the base drive for the transistor 328 is not sufficient to keep the transistor 328 on; therefore, the transistor 328 turns off and acts as an open switch. Thus, the transistor 328 in combination with the transformer 326 and resistor 322 act similarly with the relay 306 from FIG. 3A. Thus, after a time period that is proportional to the energy extracted by the energy harvesting sensor 202, the transistor 328 may be configured to turn off and act as an open switch. For example, if energy harvesting sensor 202 is a thermoelectric generator, then the voltage is generated at a rate that is proportional to the temperature of the sensed environment 210 (e.g., the greater the temperature of sensed environment 210, the higher the rate of voltage generation); therefore, the transistor 328 turns off earlier when the temperature is higher and later when the temperature is lower.

In response to the transistor 328 turning off, energy transfers from the energy harvesting sensor 202 to be stored by the capacitor 330 acting as the energy storage device 204 and the transistor 328 turns on again. Transformer 340 and capacitor 330 create an LC circuit (i.e., a resonant circuit, tank circuit, or tuned circuit). The LC resonant frequency created by transformer 340 and capacitor 330 is tuned to antenna 332 causing the antenna to broadcast a data transmission frame as signal 122. In other words, as the energy transfers to the capacitor 330, the energy is formed into an LC tank which is connected to the antenna 332. The frequency at which this oscillation occurs (i.e., the frequency of the periodic transfer of energy from energy harvesting sensor 202 to the LC tank) corresponds with the amount of energy being generated by the energy harvesting sensor 202 which, in turn, corresponds with the value of the parameter being harvested (e.g., thermal energy) from sensed environment 210. Therefore, the frequency of the transmissions from antenna 332 is indicative of the value of the parameter being harvested (e.g., thermal energy).

Figure 3C:
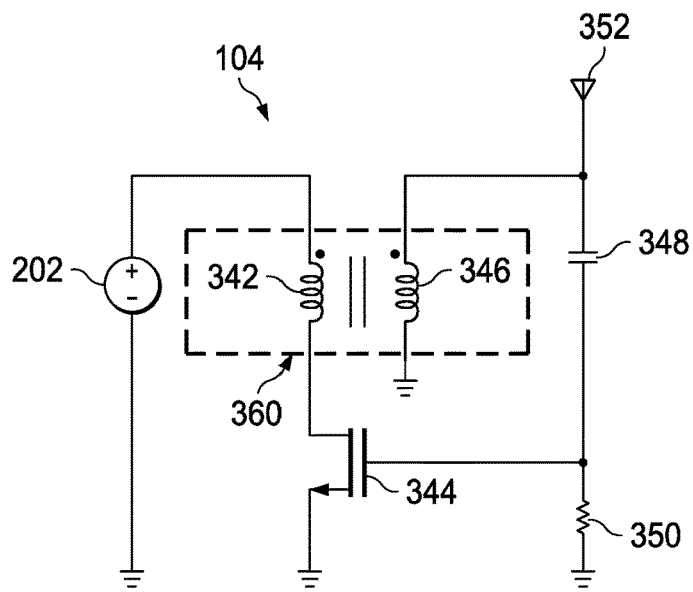
FIG. 3C shows an illustrative circuit diagram of an energy harvesting sensor node in accordance with various embodiments.

FIG. 3C shows yet another illustrative circuit diagram of energy harvesting sensor node 104 in accordance with various embodiments. In the example shown in FIG. 3C, the sensor node 104 includes energy harvesting sensor 202, secondary winding 342 and primary winding 346 that are connected in the same direction to make up transformer 360, transistor 344 which may be a metal oxide semiconductor transistor (MOSFET), resistor 350, capacitor 348, and antenna 352. As discussed previously, the energy harvesting sensor 202 is configured to extract and/or generate energy from an external source, such as sensed environment 210. The energy extracted and/or generated may take the form of a voltage, such that energy harvesting sensor 202 acts as a voltage source. Thus, energy harvesting sensor 202, as it is extracting energy from the external source, drives a current with a value that is proportional with a value of a parameter of an external source (e.g., temperature). Transistor 344 in combination with the transformer 360 and resistor 350 act similarly with the relay 306 from FIG. 3A and the transistor 328 in combination with resistor 322 and transformer 340 from FIG. 3B. Thus, after a time period that is proportional to the energy extracted by the energy harvesting sensor 202, the transistor 344 may be configured to turn from on to off and act as an open switch. For example, if energy harvesting sensor 202 is a thermoelectric generator, then the voltage is generated at a rate that is proportional to the temperature of the sensed environment 210 (e.g., the greater the temperature of sensed environment 210, the higher the rate of voltage generation); therefore, the transistor 344 turns off earlier when the temperature is higher and later when the temperature is lower.

In response to the transistor 344 turning off, energy transfers from the energy harvesting sensor 202 to be stored by the capacitor 348 acting as the energy storage device 204 and the transistor 344 turns on again. Transformer 360 and capacitor 348 create an LC circuit (i.e., a resonant circuit, tank circuit, or tuned circuit). The LC resonant frequency created by transformer 360 and capacitor 348 is tuned to antenna 352 causing the antenna to broadcast a data transmission frame as signal 122. In other words, as the energy transfers to the capacitor 348, the energy is formed into an LC tank which is connected to the antenna 352. The frequency at which this oscillation occurs (i.e., the frequency of the periodic transfer of energy from energy harvesting sensor 202 to the LC tank) corresponds with the amount of energy being generated by the energy harvesting sensor 202 which, in turn, corresponds with the value of the parameter being harvested (e.g., thermal energy) from sensed environment 210. Therefore, the frequency of the transmissions from antenna 352 is indicative of the value of the parameter being harvested (e.g., thermal energy).

Figure 4:
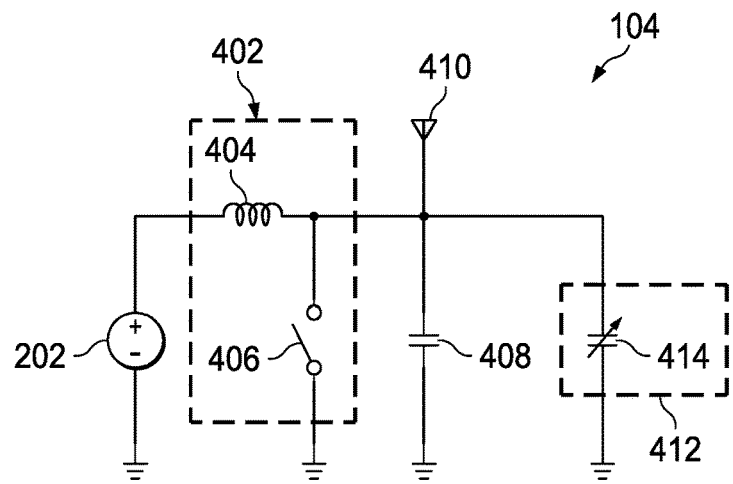
FIG. 4 shows an illustrative circuit diagram of an energy harvesting sensor node that includes two sensors in accordance with various embodiments.

FIG. 4 shows an illustrative circuit diagram of an energy harvesting sensor node 104 that includes two sensors, energy harvesting sensor 202 and parameter sensor 412 in accordance with various embodiments. In the example shown in FIG. 4, the sensor node 104 includes energy harvesting sensor 202, relay 402 which may be comprised of inductor 404 and switch 406, capacitor 408, parameter sensor 412 which may, in some embodiments, include variable capacitor 414, and antenna 410 which may be a part of transceiver 208. As discussed previously, the energy harvesting sensor 202 is configured to extract and/or generate energy from an external source, such as sensed environment 210. The energy extracted and/or generated may take the form of a voltage, such that energy harvesting sensor 202 acts as a voltage source. Thus, energy harvesting sensor 202, as it is extracting energy from the external source, magnetizes the relay 402's inductor 404 at the rate that is proportional with the value of the parameter being harvested (e.g., thermal energy), thus building energy inside the inductor 404. Switch 406 may be configured to be closed while the energy harvesting sensor 202 magnetizes the inductor 404. Once a threshold level of current flows through inductor 404, the switch 406 opens. In other words, after a time period that is proportional to the energy extracted by the energy harvesting sensor 202, the switch 406 may be configured to open. For example, if energy harvesting sensor 202 is a thermoelectric generator, then the voltage is generated at a rate that is proportional to the temperature of the sensed environment 210 (e.g., the greater the temperature of sensed environment 210, the higher the rate of voltage generation); therefore, the switch 406 opens earlier when the temperature is higher and later when the temperature is lower.

In response to the switch 406 opening, energy transfers from the energy harvesting sensor 202 to be stored by the capacitor 408 acting as the energy storage device 204 and the switch 406 closes again. Inductor 404 and capacitor 408 create an LC circuit (i.e., a resonant circuit, tank circuit, or tuned circuit). The LC resonant frequency created by inductor 404 and capacitor 408 is tuned to antenna 410 causing the antenna to broadcast a data transmission frame as signal 122. In other words, as the energy transfers to the capacitor 408, the energy is formed into an LC tank which is connected to the antenna 410. The frequency at which this oscillation occurs (i.e., the frequency of the periodic transfer of energy from energy harvesting sensor 202 to the LC tank) corresponds with the amount of energy being generated by the energy harvesting sensor 202 which, in turn, corresponds with the value of the parameter being harvested (e.g., thermal energy) from sensed environment 210. Therefore, the frequency of the transmissions from antenna 410 is indicative of the value of the parameter being harvested (e.g., thermal energy).

Parameter sensor 412 may also be included in sensor node 104. In some embodiments, parameter sensor 412 is configured to sense a second parameter of the external source. For example, energy harvesting sensor 202 may be configured to harvest thermal energy and transmit data transmission frames at a frequency that indicates the temperature of sensed environment 210 while parameter sensor 412 may be a pressure sensor configured to sense the pressure of sensed environment 210 utilizing variable capacitor 414. The parameter sensor 412 may also be configured to tune the LC resonant frequency proportional to the value of the second parameter. Therefore, the data collected by the parameter sensor 412 is encoded via frequency modulation in a single data transmission frame. Thus, a value of one parameter of the sensed environment 210 (e.g., thermal energy and/or temperature) may be determined based on the frequency of the data transmission frames while the value of a second parameter of the sensed environment 210 (e.g., pressure) may be determined based on the frequency modulation in a single data transmission frame.

Figure 5:
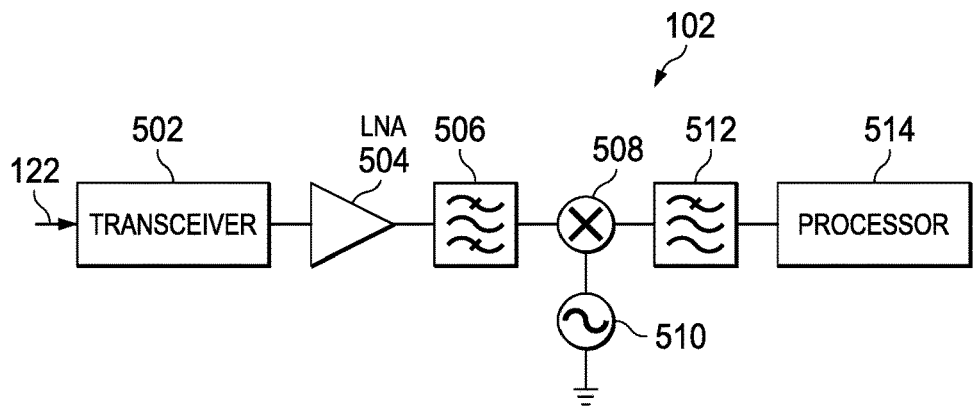
FIG. 5 shows an illustrative block diagram of a WSN base station in accordance with various embodiments.

FIG. 5 shows an illustrative block diagram of WSN base station 102 in accordance with various embodiments. Base station 102 may comprise transceiver 502, amplifier 504, band pass filter 506, mixer 508, local oscillator 510, low pass filter 512, and processor 514. Transceiver 502 may be any type of transceiver including a wired and/or wireless transceiver. More specifically, transceiver 502 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications including Wi-Fi and/or Bluethooth communications. Transceiver 502 is configured to receive the data transmission frames transmitted as signals 122-126 from the sensor nodes 104-108.

Amplifier 504, bandpass filter 506, mixer 508, local oscillator 510, and low pass filter 512 may, in some embodiments, be utilized to prepare the received signals 122-126 for processing by processor 514. For example, amplifier 504, which may be a low-noise amplifier, which is utilized to amplify any of signals 122-126 (i.e., the data transmission frames) after being received by transceiver 502. Filters 506 and 512 may be utilized to filter unwanted noise from signals. The local oscillator 510 in conjunction with the mixer 508 may be utilized to change the frequency of the signals 122-126 so that the signal may be processed at a fixed frequency. In some embodiments, additional components may be present in base station 102. Additionally, in some embodiments, the base station 102 may have some of or none of the amplifier 504 bandpass filter 506, mixer 508, local oscillator 510, and low pass filter 512.

Processor 514 is hardware that may carry out computer instructions by performing, for example, arithmetic, logical, and input/output (I/O) operations for base station 102. Processor 514 may include a central processing unit (CPU), a semiconductor-based microprocessor, a graphics processing unit (GPU), other hardware devices suitable for retrieval and execution of instructions that may be stored on in memory. Additionally, processor 514 may include a single processor, multiple processors, a single computer, a network of computers, or any other type of processing device. For example, processor 514 may include multiple cores on a chip, multiple cores across multiple chips, multiple cores across multiple devices, or combinations thereof. Processor 514 may include at least one integrated circuit (IC), other control logic, other electronic circuits, or combinations thereof that include a number of electronic components. In some embodiments, processor 514 is a digital signal processor (DSP). In other embodiments, processor 514 is any hardware device that is capable of processing the signals 122-126.

Processor 514 is configured to receive the data transmission frames that are sent as part of signal 122. The processor 514 may calculate a frequency of the data transmission frames that were transmitted by the sensor node 104. For example, the processor 514 may determine the time between receiving one data transmission frame and receiving the next data transmission frame (i.e., the period of the data transmission frames). Once the period is calculated, the frequency may be determined by processor 514. Based on the period and/or the frequency of the data transmission frames, the processor 514 may determine the value of the first parameter of the external source. For example, the processor 514 may determine the temperature of the sensed environment 210 based on the period and/or the frequency of the data transmission frames. The shorter the time period and the higher the frequency of the data transmission frames, the higher the temperature. In some embodiments, an equation may map the periodicity of the data transmission frames to the parameter. In another embodiment, a look-up table may be utilized to map the periodicity of the data transmission frames to the parameter. In yet other embodiments, the parameter may be determined apriori through bench testing and programmed into base station 102. In other embodiments, additional methods may be utilized to map the periodicity of the data transmission frames to the parameter.

Processor 514 may also be configured to calculate the LC resonant frequency that is found within each of the data transmission frames. Based on the LC resonant frequency, the processor 514 may be configured to determine a value of a second parameter of the external source. For example, in addition to determining temperature of sensed environment 210, the processor 514 may determine the pressure of the sensed environment 210 based on the LC resonant frequency of one of the data transmission frames.

In some embodiments, instead of utilizing processor 514 to calculate the parameter and/or parameters based on the rate of data transmission frames received from one of the sensor devices 104-108, base station 102 may instead transmit the data received from the sensor devices 104-108 over WAN 130 to another device for further processing.

Figure 6:
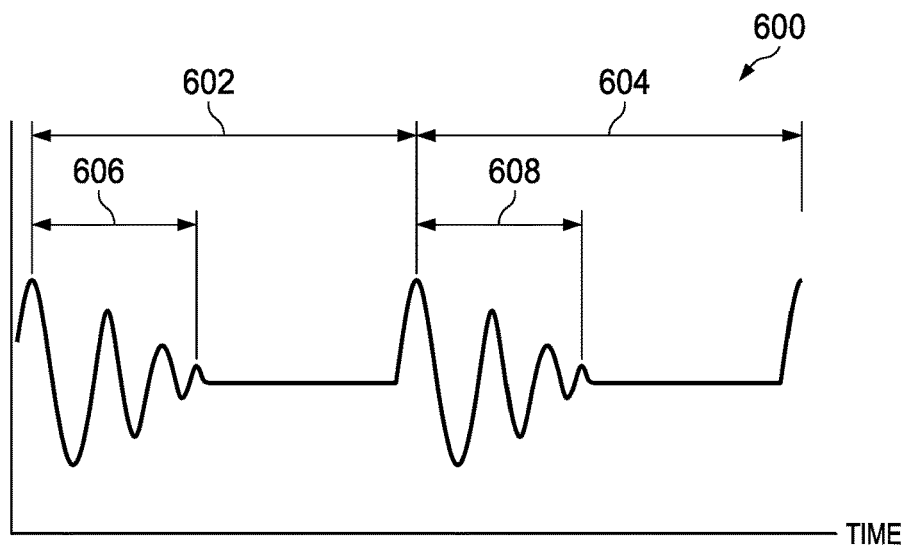
FIG. 6 shows an example of two data transmission frames in accordance with various embodiments.

FIG. 6 shows an example 600 of two data transmission frames 602-604 in accordance with various embodiments. Data transmission frames 602-604 are bursts of signal intensity. The period of data transmission frame 602 may be calculated by determining the time from the beginning of data transmission frame 602 to the beginning of data transmission frame 604. As discussed previously, this period and/or frequency of data transmission frames may be utilized to determine a value of a parameter of sensed environment 210. The data encoded into each data transmission frame (i.e., data 606 for data transmission frame 602 and data 608 for data transmission frame 604) may be utilized to determine a value of a second parameter of the sensed environment 210. More particularly, the LC resonant frequency, as shown in 606 and 608, may be utilized to determine the value of the second parameter.

Figure 7:
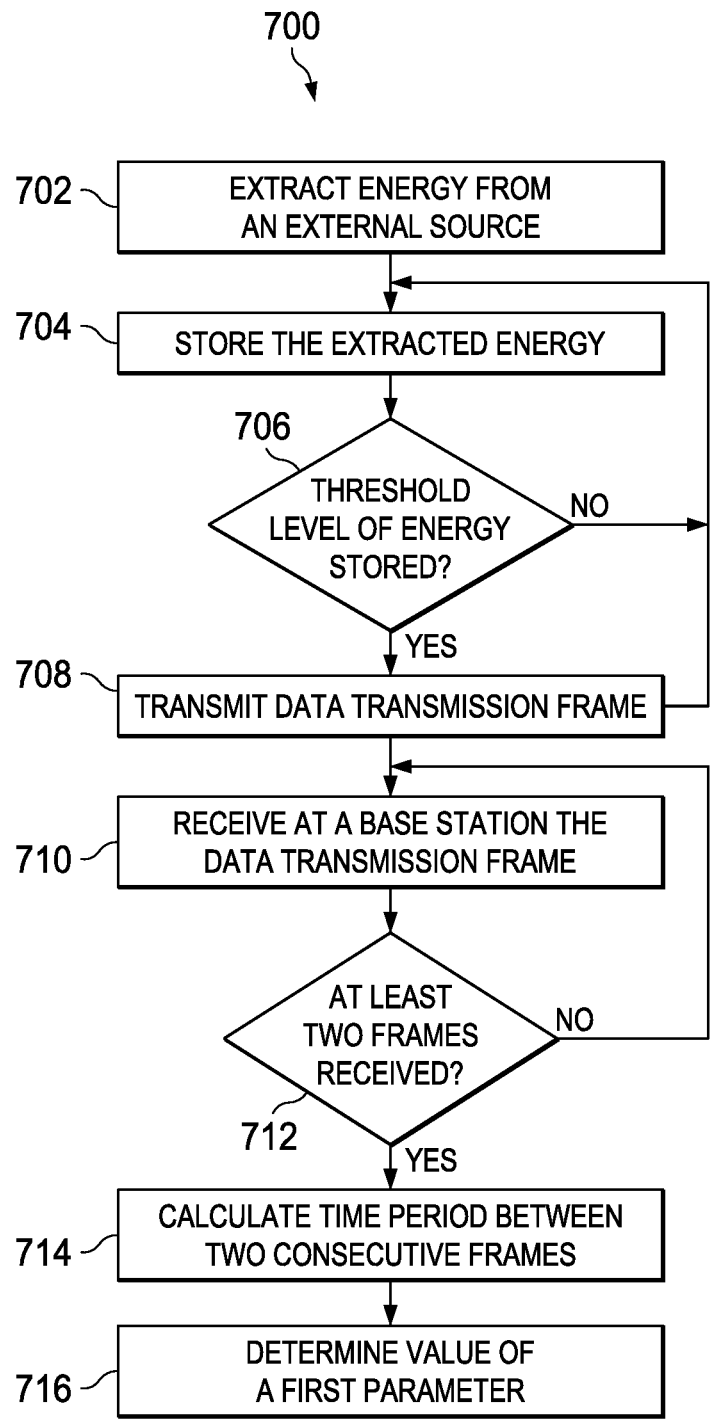
FIG. 7 shows an illustrative flow diagram of a method for transmitting parameter information about an external source from an energy harvesting sensor node to a WSN base station in accordance with various embodiments.

FIGS. 7 and 8 show flow diagrams 700 and 800 of methods for transmitting parameter information about an external source from an energy harvesting sensor node to a WSN base station in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the methods 700 and 800, as well as other operations described herein, can be performed by base station 102 and sensor node 104 and implemented by a processor executing instructions stored in a non-transitory computer readable storage medium.

The method 700 begins in block 702 with extracting energy from an external source. The energy harvesting sensor 202 may extract energy from a parameter (i.e., condition) of sensed environment 210 at a rate proportional to a value of the parameter. For example, if the energy harvesting sensor 202 is a thermoelectric generator, the energy harvesting sensor 202 extracts energy from the heat content of the sensed environment 210 at a rate that is based on the amount of heat (i.e., thermal energy) in the sensed environment 210. In block 704, the method 700 continues with storing the extracted energy. In an embodiment, the extracted energy is stored in energy storage device 204 at the same rate in which the energy is extracted from the sensed environment 210.

The method 700 continues in block 706 with determining whether the energy stored in the energy storage device has reached a threshold level. The threshold level may be set as the minimum amount of energy needed to be stored to enable a transmission of a data transmission frame. If, in block 706, a determination is made that the energy stored in the energy storage device has not reached the threshold level, the method 700 continues in block 704 with storing the extracted energy. However, if, in block 706, a determination is made that the energy stored in the energy storage device has not reached the threshold level, the method 700 continues in block 708 with transmitting, in some embodiments, utilizing transceiver 208, a data transmission frame. The transmission of the data transmission frame may discharge the energy storage device such that the energy stored in the energy storage device drops below the threshold level. The method 700 continues in block 704 with storing extracted energy in the energy storage device and also continues in block 710 with receiving at a base station, such as base station 102, the data transmission frame. The data transmission frame may be received by transceiver 502.

In block 712, the method 700 continues with determining whether at least two data transmission frames have been received by the base station. If, in block 712, a determination is made that at least two data transmission frames have not been received by the base station, then the method continues in block 710 with receiving another data transmission frame. However, if, in block 712, a determination is made that at least two data transmission frames have been received by the base station, then the method continues in block 714 with calculating, in some embodiments by processor 514, the time period between two consecutive data transmission frames. In block 716, the method 700 continues with determining the value of a first parameter, such as a condition (e.g., temperature) of the sensed environment based on the time period calculated.

The method 800 begins in block 802 with extracting energy from an external source. The energy harvesting sensor 202 may extract energy from a parameter (i.e., condition) of sensed environment 210 at a rate proportional to a value of the parameter. For example, if the energy harvesting sensor 202 is a thermoelectric generator, the energy harvesting sensor 202 extracts energy from the heat content of the sensed environment 210 at a rate that is based on the amount of heat (i.e., thermal energy) in the sensed environment 210. In block 804, the method 800 continues with storing the extracted energy. In an embodiment, the extracted energy is stored in energy storage device 204 at the same rate in which the energy is extracted from the sensed environment 210.

The method 800 continues in block 806 with determining whether the energy stored in the energy storage device has reached a threshold level. The threshold level may be set as the minimum amount of energy needed to be stored to enable a transmission of a data transmission frame. If, in block 806, a determination is made that the energy stored in the energy storage device has not reached the threshold level, the method 800 continues in block 808 with sensing a second parameter of the sensed environment 210. For example, a parameter sensor 412 may be utilized to sense a second parameter (e.g., pressure) of the sensed environment 210. In block 810, the method 800 continues with tuning the LC resonant frequency to a frequency proportional to a value of the second parameter. The method 800 continues in block 804 with storing the extracted energy in the energy storage device.

However, if, in block 806, a determination is made that the energy stored in the energy storage device has not reached the threshold level, the method 800 continues in block 812 with transmitting, in some embodiments utilizing transceiver 208, a data transmission frame. The transmission of the data transmission frame may discharge the energy storage device, such that the energy stored in the energy storage device drops below the threshold level. The method 800 continues in block 804 with storing extracted energy in the energy storage device and also continues in block 814 with receiving at a base station, such as base station 102, the data transmission frame. The data transmission frame may be received by transceiver 502.

In block 816, the method 800 continues with determining whether at least two data transmission frames have been received by the base station. If, in block 816, a determination is made that at least two data transmission frames have not been received by the base station, then the method continues in block 814 with receiving another data transmission frame. However, if, in block 816, a determination is made that at least two data transmission frames have been received by the base station, then the method continues in block 818 with calculating, in some embodiments by processor 514, the time period between two consecutive data transmission frames and the LC resonant frequency. In block 820, the method 800 continues with determining the value of a first parameter, such as a condition (e.g., thermal energy and/or temperature) of the sensed environment based on the time period calculated. In block 822, the method 800 also continues with determining the value of the second parameter (e.g., pressure) based on the LC resonant frequency.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An environmental energy harvesting sensor node, comprising:
    an environmental energy harvesting sensor configured to extract environmental energy from an environmental external source at a rate proportional to a value of a first parameter of the environmental external source;
    an energy storage device coupled to the environmental energy harvesting sensor and configured to store the extracted energy from the environmental energy harvesting sensor at the rate proportional to the value of the first parameter; and
    a wireless transceiver coupled to the energy storage device and configured to wirelessly transmit plural frames of data with the extracted energy stored in the energy storage device, with each data transmission frame using all of the energy stored in the energy storage device, and with the period between the transmitted frames being proportional to the value of the first parameter.

2. The environmental energy harvesting sensor node of claim 1, including trigger circuitry configured to, in response to the energy storage device storing a threshold level of energy, cause the transceiver to transmit one of the plurality of data transmission frames.

3. The environmental energy harvesting sensor node of claim 2, in which the threshold level of energy corresponds with a minimum amount of energy needed to enable transmission of one of the plurality of data transmission frames.

4. The environmental energy harvesting sensor node of claim 1, including a relay that includes an inductor and a switch, in which:
    the environmental energy harvesting sensor is further configured to magnetize the inductor at the rate proportional to the value of the first parameter;
    the switch is configured to open after a time that is proportional to the energy extracted by the environmental energy harvesting sensor;
    the energy storage device is a capacitor configured to store the extracted energy in response to the switch opening; and
    the transceiver including an antenna that is configured to receive a LC resonant frequency that is tuned to the antenna and generated by the inductor and the capacitor causing the antenna to transmit one of the plurality of data transmission frames.

5. The environmental energy harvesting sensor node of claim 4, including a parameter sensor coupled to the capacitor, the parameter sensor configured to sense a second parameter of the environmental external source, in which the parameter sensor includes a variable capacitor configured to tune the LC resonant frequency of each frame proportional to a value of the second parameter.

6. The environmental energy harvesting sensor node of claim 5, in which the energy storage device is a battery.

7. The environmental energy harvesting sensor node of claim 1, in which the first parameter of the environmental external source is stress, strain, chemical potentials, ambient light, ambient infrared light, or temperature.

8. The environmental energy harvesting sensor node of claim 1, in which the environmental energy harvesting sensor is a piezoelectric device, an electrochemical device, a solar device, or a thermoelectric generator.

9. The environmental energy harvesting sensor node of claim 5, in which the plurality of data transmission frames are Bluetooth low energy (BLE) frames, WiFi frames, or low-rate wireless personal area network (LR-WPAN) frames.

10. A method comprising:
    extracting, by an environmental energy harvesting sensor, environmental energy from an environmental external source at a rate proportional to a value of a first parameter of the environmental external source;
    storing, by an energy storage device, the extracted environmental energy at the rate proportional to the value of the first parameter;
    in response to the energy storage device storing a threshold level of energy a first time, transmitting, by a sensor node transceiver, a first data transmission frame utilizing the energy storage device to provide power to the sensor node transceiver thereby decreasing the energy stored in the energy storage device below the threshold level;

in response to the energy storage device storing the threshold level of energy a second time, transmitting a second data transmission frame with a time period between the start of the first data transmission frame and the start of the second data transmission frame being proportional to the value of the first parameter.

11. The method of claim 10, including:
receiving, by a base station transceiver, the first and second data transmission frames; and
calculating, by a processor of the base station, a time period between receiving the first and the second data transmission.

12. The method of claim 11, including, based on the time period between receiving the first and the second data transmission, determining, by the processor, the value of the first parameter.

13. The method of claim 10, including:
sensing a second parameter from the environmental source; and
tuning an LC resonant frequency proportional to a value of the second parameter,
in which the first data transmission frame includes the LC resonant frequency.

14. The method of claim 13, including:
receiving, by a base station transceiver, the first and second data transmission frames;
calculating, by a processor of the base station, a time period between receiving the first and the second data transmission and the LC resonant frequency;
based on the time period between receiving the first and second data transmission, determining the value of the first parameter; and based on the LC resonant frequency, determining the value of the second parameter.

15. The method of claim 14, in which the first parameter is temperature and the second parameter is pressure.

16. A system, comprising:
a transceiver configured to receive data transmission frames from a first environmental energy harvesting sensor node; and
a processor communicatively coupled to the transceiver, the processor configured to calculate a time periodicity between the starts of the data transmission frames and determine a value of a first parameter of a first environmental external source based on the periodicity of the data transmission frames.

17. The system of claim 16, in which the processor is further configured to calculate a LC resonant frequency of one of the data transmission frames and determine a value of a second parameter of the first environmental external source based on the LC resonant frequency.

18. The system of claim 16, in which the first parameter is temperature and the second parameter is pressure.

19. The system of claim 16, in which the processor is configured to calculate the periodicity of the data transmission frames by calculating the time between receiving a first data transmission frame and a second data transmission frame.

20. The system of claim 16, in which:
the transceiver is further configured to receive second data transmission frames from a second environmental energy harvesting sensor node; and
the processor is further configured to calculate a periodicity of the second data transmission frames and determine a value of a parameter of the second environmental external source based on the frequency of the second data transmission frames.

* * * * *